United States Patent Office

Re. 26,178
Reissued Mar. 21, 1967

26,178

METHOD OF CONTROLLING MICROORGANISMS WITH 2-HALO-SUBSTITUTED ACETOPHENONES

George E. Lukes, Kentfield, and Thomas B. Williamson, Santa Clara, Calif., assignors to Stauffer Chemical Company, New York, N.Y., a corporation of Delaware No Drawing. Original No. 3,184,379, dated May 18, 1965, Ser. No. 172,849, Feb. 13, 1962. Application for reissue Oct. 4, 1965, Ser. No. 493,309
6 Claims. (Cl. 167—30)

Matter enclosed in heavy brackets [ ] appears in the original patent but forms no part of this reissue specification; matter printed in italics indicates the additions made by reissue.

This invention pertains to a method of controlling pest microorganisms by contacting them with certain substituted 2-halomethyl aryl ketones. The invention is also concerned with the preparation, use and application of biocidally active compositions containing as the toxic component thereof at least one of the aforementioned halomethyl aryl ketones.

The present invention is predicated on the finding that certain halomethyl aryl ketones, particularly 2-bromoacetophenones, are highly toxic to microorganisms of the type which affect commercial food crops. We have, for instance, ascertained that these chemical compounds are especially effective in combating certain varieties of destructive soil fungi such as Rhizoctonia solani, Fusarium solani and the like. Other deleterious microorganisms which are susceptible to the toxicants of the invention include bacteria and, in this case, reference is made to Aspergillus niger, Penicillium and Escherichia coli.

The halomethyl aryl ketones, the biocidal properties and use of which are contemplated herein, can be depicted by the following formulae:

(I)

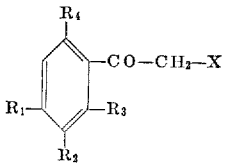

and (II)

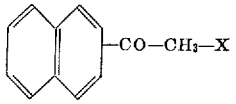

wherein $R_1$, $R_2$, $R_3$ and $R_4$ designate hydrogen, a lower alkyl radical, a lower alkoxyl radical, amino, nitro and halogen e.g. fluorine, chlorine or bromine, it being understood at least one of said $R_1$, $R_2$, $R_3$ and $R_4$ is a substituent other than hydrogen and X can be chlorine or bromine. Specific configurations falling within the ambit of Formulae I and II are exemplified in the list of structures below:

Compound 1

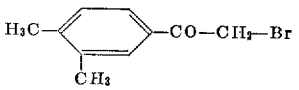

Compound 2

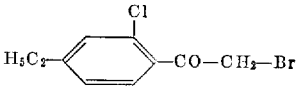

Compound 3

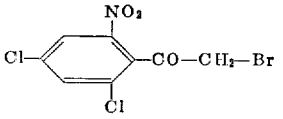

Compound 4

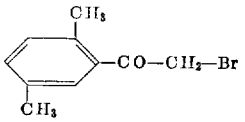

Compound 5

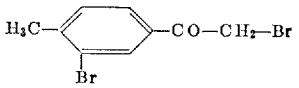

Compound 6

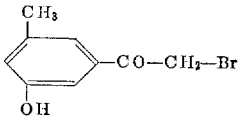

Compound 7

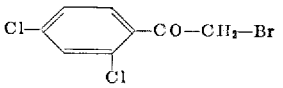

Compound 8

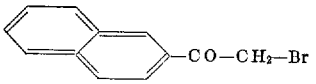

Compound 9

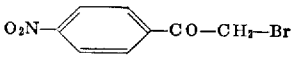

Compound 10

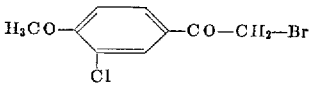

Compound 11

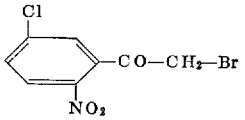

Compound 12

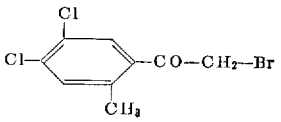

Compound 13

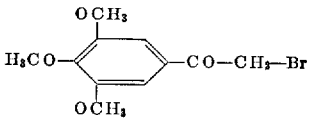

Compound 14

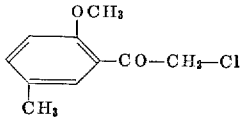

Compound 15

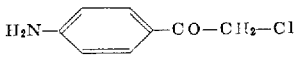

Compound 16

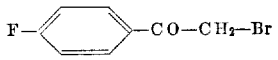

Compound 17

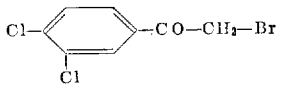

Compound 18

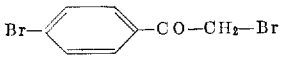

Compound 19

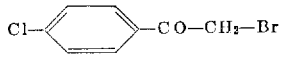

Compound 20

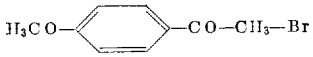

Compound 21

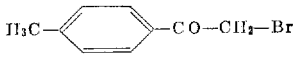

Compound 22

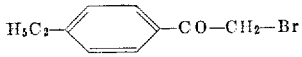

Compound 23

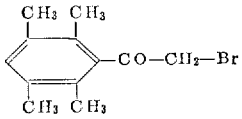

Compound 24

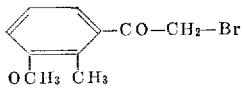

Compound 25

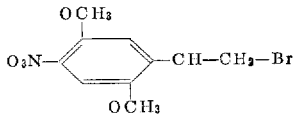

Compound 26

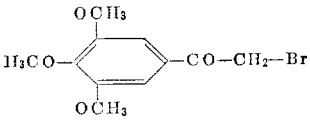

Compound 27

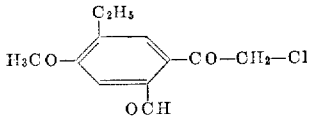

The halomethyl aryl ketones utilized in carrying out the biocidal processes of this invention are, in some cases, known chemical entities and their description and preparation are detailed in the technical literature. In general, these compounds are formed by the halogenation at the side chain, that is, either chlorination or bromination of the requisite acetophenone having the desired number and type of substituents on the aromatic ring. Occasions may be encountered wherein the halogenation proceeds at an impractically low velocity and, in such instances, the reaction is accelerated by the use of catalysts, and for this purpose, certain anhydrous heavy metal salt halides, i.e. ferric chloride, zinc chloride etc. are especially efficacious. An alternate procedure whereby one may arrive at the compounds of the invention comprises the chloroacetylation of the requisite aromatic ring compound having the appropriate number and arrangement of substituents. Further details of the aforedisclosed reactions can be had by resorting to the original technical literature of which the various chemical journals and patent literature are particularly useful.

In using the 2-halomethyl aryl ketones as contemplated herein, it is merely necessary to contact, with these toxicants, the microorganism, the growth of which it is desired to control. This can be accomplished by a variety of procedures which are known to the art. For instance, a solution of the compound in an organic solvent may be applied directly to the soil in the form of a spray. Alternately dispersions of the compounds in a water media may be advantageously employed. In the latter case, the use of various surface active agents or soaps may be desirable for the purpose of stabilizing the dispersions. Since the compounds of the invention have been found to be non-phyto-toxic, the non-volatile representatives can be mixed with talc or other inert binder and the resultant mixture combined with the cotton or bean seed before planting into fungus infected soil. Fumigation techniques may also be resorted to if the volatility of the compound is sufficiently high. The biocidal activity of the compounds of the invention are set forth in the table below:

TABLE

| Compound | P.p.m. for 100% Inhibition | | | | |
|---|---|---|---|---|---|
| | Aspergillus niger | Penicillium | Escherichia coli | Rhizoctonia solani | Fusarium solani |
| 1 | 10 | 10 | 50 | 55 | 27 |
| 4 | 5 | 10 | ---------- | 55 | 13 |
| 7 | 10 | 10 | 50 | 110 | 13 |
| 8 | 10 | 10 | ---------- | 55 | 27 |
| 9 | 25 | 25 | 25 | 55 | 13 |
| 15 | 50 | 50 | 50 | ---------- | ---------- |
| 16 | 5 | 5 | 10 | 27 | 13 |
| 17 | 5 | 5 | 25 | 55 | 27 |
| 18 | 5 | 5 | 10 | ---------- | 13 |
| 19 | 5 | 5 | 25 | ---------- | 13 |
| 20 | 5 | 5 | 50 | ---------- | 5 |
| 21 | 5 | 5 | 25 | ---------- | 5 |
| 22 | 10 | 10 | 50 | 110 | 13 |

In ascertaining the bactericidal activity of the herein contemplated compounds, 1 oz. bottles were partially filled with 10 ml. of malt or nutrient broth, the containers capped with aluminum foil, sterilized and a solution of the compound to be tested injected by means of a syringe through the foil into the broth. Water suspensions of such typical bacteria as Aspergillus niger, Penicillium and Escherichia coli were injected into the broth and the bottles sealed and held for one week, after which the bacteria count was recorded.

The activity of the compounds of the invention against such soil fungi as Rhizoctonia solani and Fusarium solani was determined by incorporating the microorganisms into sterilized soil and 1 lb. portions of this admixture were placed in quart jars. A small depression was formed in the soil and filled with coarse sand. 1 ml. of 5% acetone solution of the compound to be tested was introduced on to the sand and the jar sealed. The contents of the container were then thoroughly shaken and the infected soil seeded with representative commercial crops such as cotton or Pinto beans. After an interval of about 2 or 3 weeks, the plants were examined and the treated plants compared with the controls, having no treatment.

We claim:

1. A method of inhibiting the growth of microorganisms which comprises applying thereto a small but effective amount of a 2-halomethyl aryl ketone of the following formula:

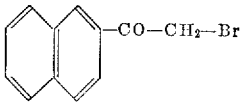

2. A method of inhibiting the growth of microorganisms which comprises applying thereto a small but effective amount of 2-halomethyl naphthyl ketone of the following formula:

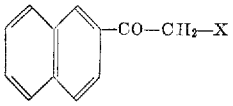

wherein X is selected from the class consisting of chlorine and bromine.

*3. A method of inhibiting microorganism growth comprising, applying to said microorganism habitat a microbiologically effective amount of a compound of the formula:*

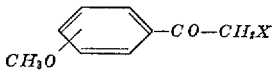

*wherein X is selected from the group consisting of bromine and chlorine.*

*4. A method of inhibiting the growth of microorganisms comprising applying to said microorganism habitat a microbiologically effective amount of a compound of the formula:*

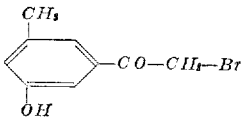

*5. A method of inhibiting the growth of microorganisms comprising applying to said microorganism habitat a microbiologically effective amount of a compound of the formula:*

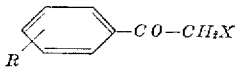

*wherein R is selected from the group consisting of lower alkyl, methoxy, and amino and X is selected from the group consisting of bromine and chlorine.*

*6. A method as stated in claim 5 wherein R is 4-methoxy and X is bromine.*

References Cited by the Examiner

The following references, cited by the Examiner, are of record in the patented file of this patent or the original patent.

UNITED STATES PATENTS

| | | | |
|---|---|---|---|
| Re. 26,009 | 5/1966 | Buckman et al. | 162—161 |
| 2,901,394 | 8/1959 | Rosher | 167—30 |
| 3,021,256 | 2/1962 | Bollenback et al. | 162—161 |

FOREIGN PATENTS

| | | |
|---|---|---|
| 1,330,953 | 6/1962 | France. |

ALBERT T. MEYERS, *Primary Examiner.*

JULIAN S. LEVITT, *Examiner.*

GEORGE A. MENTIS, *Assistant Examiner.*

PO-1050
(5/69)

UNITED STATES PATENT OFFICE

CERTIFICATE OF CORRECTION - "A"

Reissue

Patent No. 26,178 Dated March 21, 1967

Inventor(s) George E. Lukes and Thomas B. Williamson

It is certified that error appears in the above-identified patent and that said Letters Patent are hereby corrected as shown below:

In Column 2, Compound 13, the formula should read:

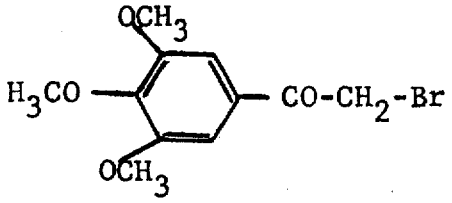

In Column 3, Compound 24, the formula should read:

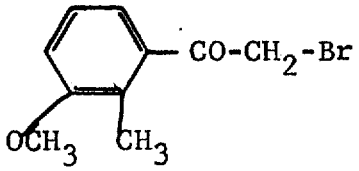

In Column 3, Compound 25, the formula should read:

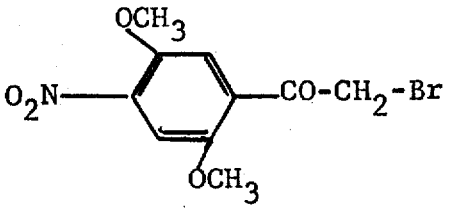

PO-1050
(5/69)

UNITED STATES PATENT OFFICE
CERTIFICATE OF CORRECTION - "B"

Patent No. 26,178 Dated March 21, 1967

Inventor(s) George E. Lukes and Thomas B. Williamson

It is certified that error appears in the above-identified patent and that said Letters Patent are hereby corrected as shown below:

In Column 1, under line 47, the formula (II) should read as follows:

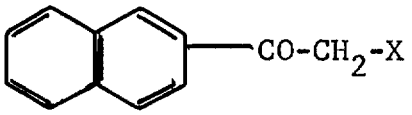

In Column 1, Compound 20, the formula should read:

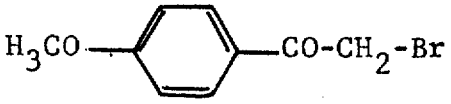

In Column 3, Compound 26, the formula should read:

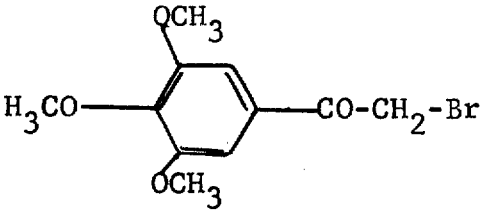

(continued on Page 2)

PO-1050
(5/69)

UNITED STATES PATENT OFFICE

CERTIFICATE OF CORRECTION - "B" Page 2

Patent No. 26,178 Dated March 21, 1967

Inventor(s) George E. Lukes and Thomas B. Williamson

It is certified that error appears in the above-identified patent and that said Letters Patent are hereby corrected as shown below:

In Column 3, Compound 27, the formula should read:

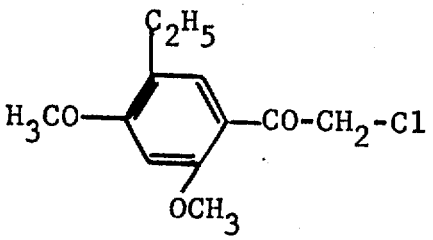

SIGNED
NOV 3 1970
1970

(SEAL)
Attest:

Edward M. Fletcher, Jr.
Attesting Officer

WILLIAM E. SCHUYLER, JR.
Commissioner of Patents